United States Patent
Cunningham

(10) Patent No.: US 11,811,473 B2
(45) Date of Patent: Nov. 7, 2023

(54) METHODS AND APPARATUS FOR SELECTING AN ANTENNA

(71) Applicant: Comcast Cable Communications, LLC, Philadelphia, PA (US)

(72) Inventor: Ryan Michael Cunningham, Haddon Heights, NJ (US)

(73) Assignee: COMCAST CABLE COMMUNICATIONS, LLC, Philadelphia, PA (US)

(*) Notice: Subject to any disclaimer, the term of this patent is extended or adjusted under 35 U.S.C. 154(b) by 0 days.

(21) Appl. No.: 17/454,452

(22) Filed: Nov. 10, 2021

(65) Prior Publication Data

US 2023/0141580 A1  May 11, 2023

(51) Int. Cl.
*H04B 7/02* (2018.01)
*H04B 7/06* (2006.01)
*H04W 4/02* (2018.01)

(52) U.S. Cl.
CPC .......... *H04B 7/0608* (2013.01); *H04W 4/023* (2013.01)

(58) Field of Classification Search
CPC .............................. H04B 7/0608; H04W 4/023
USPC ................ 375/267, 260, 259, 219, 295, 316
See application file for complete search history.

(56) References Cited

U.S. PATENT DOCUMENTS

| 2017/0194706 A1* | 7/2017 | Lee ...................... H04B 7/0619 |
| 2017/0272873 A1* | 9/2017 | Webster ............... H04R 25/554 |

* cited by examiner

*Primary Examiner* — Zewdu A Kassa
(74) *Attorney, Agent, or Firm* — BakerHostetler

(57) ABSTRACT

A device including a plurality of antennas may sense or receive data related to a magnetic field. A strength of the magnetic field may be determined. Based on the strength of the magnetic field, a location or orientation of the device may be determined. The location of the device may be used to select an antenna from the plurality of antennas for transmitting data from the device or receiving data at the device. If the location of the device is associated with historical performance data, the historical performance data may be used to select an antenna from the plurality of antennas.

20 Claims, 5 Drawing Sheets

METHODS AND APPARATUS FOR SELECTING AN ANTENNA

BACKGROUND

A device may include a plurality of antennas. Each antenna may operate differently depending on how the device is oriented relative to a receiver. As a result, it may be desirable to use different antennas based on the device's orientation. However, the process of choosing which antenna to use may adversely impact the performance of the device. For example, swapping antennas each time a re-transmission occurs may deplete the battery life of the device. If the device is configured to use two antennas simultaneously, neither antenna may operate well if they are positioned too closely together. Therefore, improvements in antenna diversity techniques are needed.

SUMMARY

Methods and apparatus for selecting an antenna are disclosed. A device may include a plurality of antennas and the device may receive a magnetic field. A strength of the magnetic field may be determined. Based on the strength of the magnetic field, a location of the device may be determined. For example, a location of the device relative to a device configured to generate the magnetic field may be determined. Based on the location of the device, an antenna may be selected from the plurality of antennas. For example, if the device is in a first location, a first antenna may be selected. If the device is in a second location, a second antenna may be selected. If the device is in a location associated with historical performance data, the historical performance data may be used to select the antenna from the plurality of antennas.

BRIEF DESCRIPTION OF THE DRAWINGS

The following drawings show generally, by way of example, but not by way of limitation, various examples discussed in the present disclosure. In the drawings.

DETAILED DESCRIPTION

A device may include a plurality of antennas. The device can be, for example, a sensing device, such as a state, position or contact sensing device (e.g., a window or door sensor, a temperature or other environmental parameter sensor, etc.). One antenna from the plurality of antennas may operate better than the other antennas when the device is in a first location, but the same antenna may not operate as well as another of the other antennas when the device is in a second location. For example, a window or door sensor with two antennas may need to switch use of antennas each time the window or door is opened or closed. One antenna may operate better when the window or door is opened, and the other antenna may operate better when the window or door is closed. However, determining an optimal antenna each time the device is moved, changes orientation or changes location, may be inefficient. For example, checking the performance of each antenna from the plurality of antennas every time the device changes position may be time- or power-consuming.

Many small devices, such as window or door sensors, are low-power devices. Such low-power devices may be battery operated. Determining an optimal antenna each time the device changes locations may reduce the device's battery life. For example, checking the performance of each antenna from the plurality of antennas every time the device changes locations may result in an increased draw on the battery. Because such devices rely entirely on a battery to operate, a reduction in battery life may adversely impact the performance of the device. As a result, the device may require frequent, costly maintenance or may require frequent battery replacements. Thus, it may be desirable to provide a mechanism to automatically select an optimal antenna when the device changes locations. Disclosed herein are systems and methods for selecting an antenna.

Figure 1:
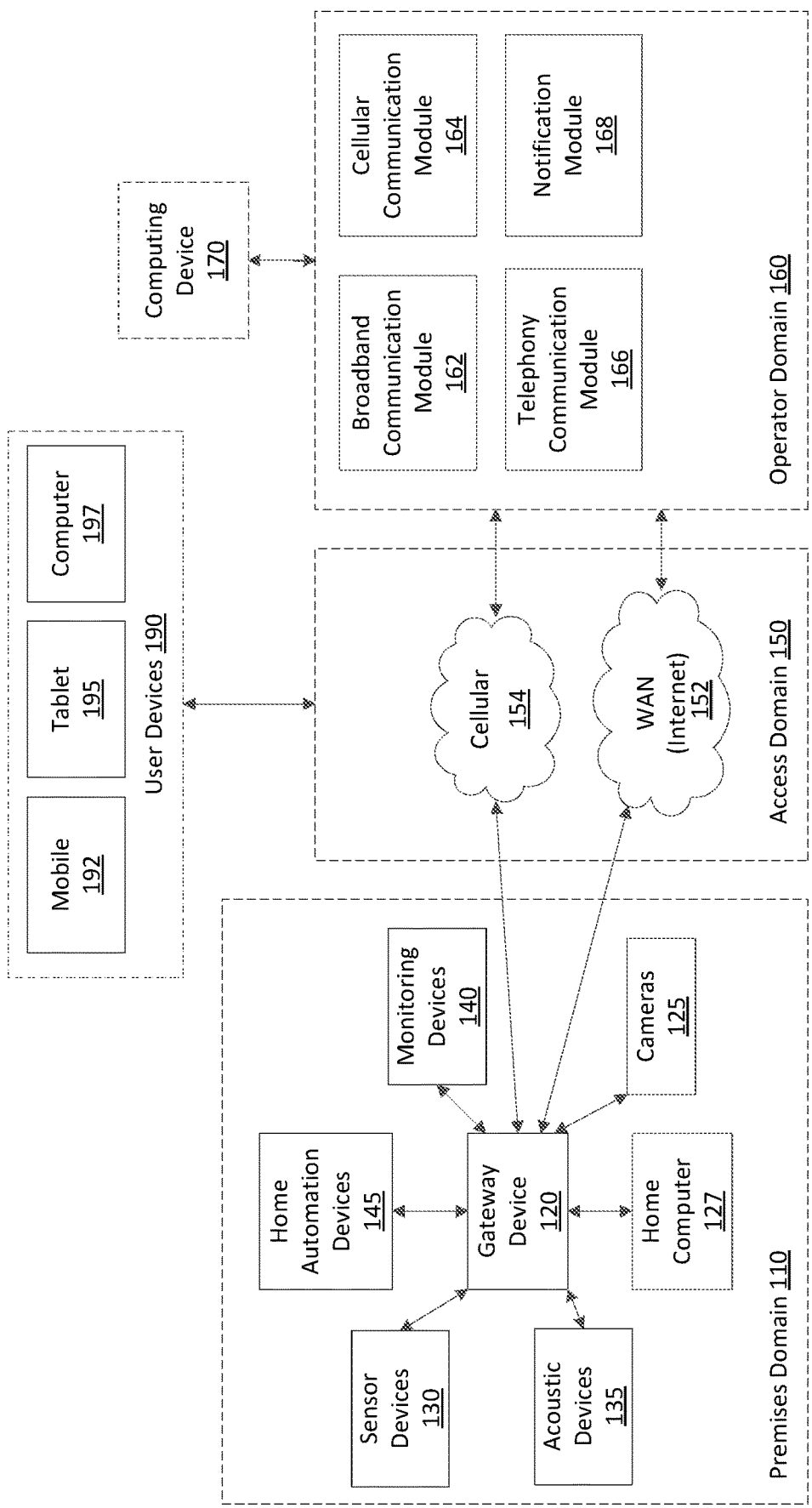
FIG. 1 shows an example network.

FIG. 1 shows an example network. The example network may comprise a premises domain 110 and an access domain 150. The premises domain 110 may comprise a gateway device 120. The premises domain 110 may be in communication with the access domain 150. The premises domain 110 may be in communication with the operator domain 160 via the access domain 150. The operator domain 160 may comprise and/or be in communication with one or more computing devices, such as the computing device 170, which may comprise a network device, such as a server, or other computing device.

The premises domain 110 may comprise a collection of security, monitoring and automation entities within a dwelling or other location, including one or more premises devices of the premises management system. The gateway device 120 may be a device that provides an interface to the various entities (e.g., cameras 125, sensor devices 130, acoustic devices 135, monitoring devices 140, home automation devices 145, home computer 127, etc.) within the premises domain 110. The gateway device 120 may be configured to act as a gateway interface between the premises domain 110 and an operator domain.

Premises devices within the premises domain 110 may comprise a variety of sensor devices 130 whose signals are received and interpreted by the gateway device 120. The sensor devices 130 may comprise door sensors, window sensors, door/window sensors, motion detectors, smoke detectors, glass break detectors, inertial detectors, water detectors, carbon dioxide detectors, light sensors, light switches, thermostats, key fob devices, and the like. The gateway device 120 may be configured to react to a change in a state of any of the sensor devices 130. The gateway device 120 may be configured to determine when a sensor device (e.g., door sensor, window sensor, etc.) changes from a closed state to an open state.

The gateway device 120 may be configured to act and/or react based on detecting a state change of one of the one or more sensor devices 130. Acting and/or reacting may comprise sounding an audio alert, outputting a visual alert to a user interface and/or generating an electronic notification upon detecting a state change. In addition to acting and reacting to changes in a state of the one or more sensor devices 130, the gateway device 120 also may be coupled to one or more acoustic devices 135. The one or more acoustic devices 135 may be configured to listen for noise/sound at the premises and record the noise/sound. The one or more acoustic devices 135 may be configured to provide audio data associated with the recorded noise/sound to the gateway device 120.

The gateway device 120 may be coupled to one or more monitoring devices 140. The one or more monitoring devices 140 may comprise video cameras that capture images and/or videos, as well as associated audio, that are viewable on a display of the gateway device 120 (e.g., via a user interface of a display of the gateway device 120). The one or more monitoring devices 140 may be coupled to the gateway device 120 wirelessly (e.g., WiFi, etc.) or via other connections. Home automation devices 145 (e.g., home area network devices having an automation interface) may be coupled to and/or controlled by the gateway device 120. The gateway device 120 may be configured to interact with a variety of home automation protocols, such as Z-Wave and ZigBee.

The gateway device 120 may be configured to communicate with a variety of sensor devices and is not limited to communication with the sensors 130, monitoring devices 140, and home automation devices 145 described above. The gateway device 120 may be used to configure and/or control the premises devices, including sensor devices 130, acoustic devices 135, monitoring devices 140, and/or automation devices 145. Data collected by the sensor devices 130, monitoring devices 140, cameras 125, and acoustic devices 135 may be sent to the gateway device 120.

The gateway device 120 may be configured to communicate with the computing device 170 residing in the operator domain 160 (e.g., located external to the premises) via networks (e.g., cellular network 154, wide area network (WAN) 152) in the access domain 150. Broadband communication can be provided by coupling the gateway device 120 with the wide area network 152, such as a provider network or the Internet. The wide area network 152 may be coupled to the computing device 170 in the operator domain 160, such as via a router and/or firewall (not shown). The gateway device 120 may comprise additional mechanisms to provide communication with the operator domain 160. The gateway device 120 may be configured with a cellular network transceiver that permits communication with the cellular network 154. The cellular network 154 may provide access to the computing device 170 in the operator domain 160. The gateway device 120 may not be limited to providing gateway functionality via cellular and dwelling-based routers and modems. The gateway device 120 may be configured with other network protocol controllers, such as a controller configured for Worldwide Interoperability for Microwave Access (WiMAX) satellite-based broadband, a controller configured for direct telephone coupling, or the like.

A computing device 170 in the operator domain 160 may be configured to provide a variety of functionalities. Logically, a computing device 170 may comprise the following functional modules: a broadband communication module 162, a cellular communication module 164, a notification module 168, and/or a telephony communication module 166. The computing device 170 may be configured to communicate with a user device (e.g., a user device 190, including user devices 192, 195, 197) associated with the user.

Figure 2:
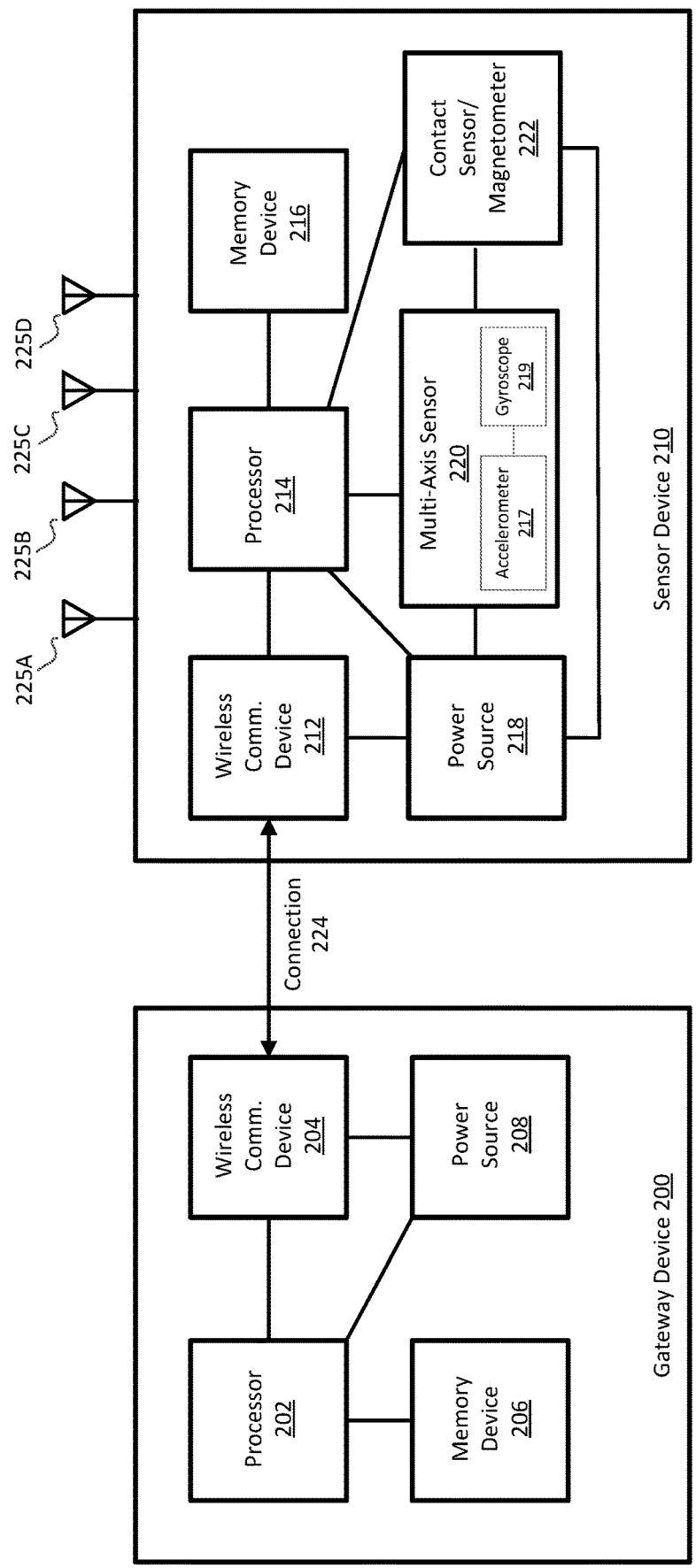
FIG. 2 shows an example system.

FIG. 2 shows an example system. The example system may comprise a gateway device 200 (e.g., gateway 120) and a sensor device 210 (e.g., sensor device 130). The sensor device 210 may be installed as a door/window open/close monitoring device.

The sensor device 210 may comprise a wireless communications device 212. The wireless communications device 212 may comprise an RF radio. The gateway device 200 may comprise a wireless communications device 204. The wireless communications device 204 may comprise an RF radio. The sensor device 210 may communicate with the gateway device 200 via connection 224. The connection 224 may be a wireless connection, such as an RF connection. The connection 224 may function in accordance with a wireless communications protocol such as, for example, Zigbee, Z-Wave, Wi-Fi or numerous other wireless protocols. The sensor device 210 may comprise a plurality of antennas 225A-D.

The gateway device 200 may comprise a power source 208. The power source 208 may comprise a power supply. The power source 208 may comprise an alternating-current (AC) power supply. In another example, the power source 208 may comprise a direct current (DC) power supply. In another example, the power source 208 may comprise an AC-DC power supply. The power source 208 may provide power to the wireless communications device 204 and/or a processor 202. The sensor device 210 may comprise a power source 218. The power source 218 may comprise a battery. The power source 218 may provide power to the wireless communications device 212, a processor 214, a multi-axis sensor 220 such as, for example, a magnetometer, a Micro Electro-Mechanical System (MEMS) accelerometer, a MEMS gyroscope or any other suitable device that detects multi-axis movement, and/or a magnetometer/contact sensor 222. The multi-axis sensor 220 may also comprise one or more of an accelerometer 217, a gyroscope 219, and the like and may be packaged as a MEMS sensor. The magnetometer/contact sensor 222 may comprise a hall effect sensor.

The gateway device 200 may comprise the processor 202. The processor 202 may be in communication with a memory device 206, the wireless communications device 204, and/or the power source 208. The processor 202 may send information to and/or receive information from the memory device 206, the wireless communications device 204, and/or the power source 208. The sensor device 210 may comprise the processor 214. The processor 214 may be in communication with the wireless communications device 212, the power source 218, the multi-axis sensor 220, the magnetometer/contact sensor 222, and/or a memory device 216. The processor 214 may send information to and/or receive information from the wireless communications device 212, the power source 218, the multi-axis sensor 220, the magnetometer/contact sensor 222, and/or the memory device 216.

Figure 3:
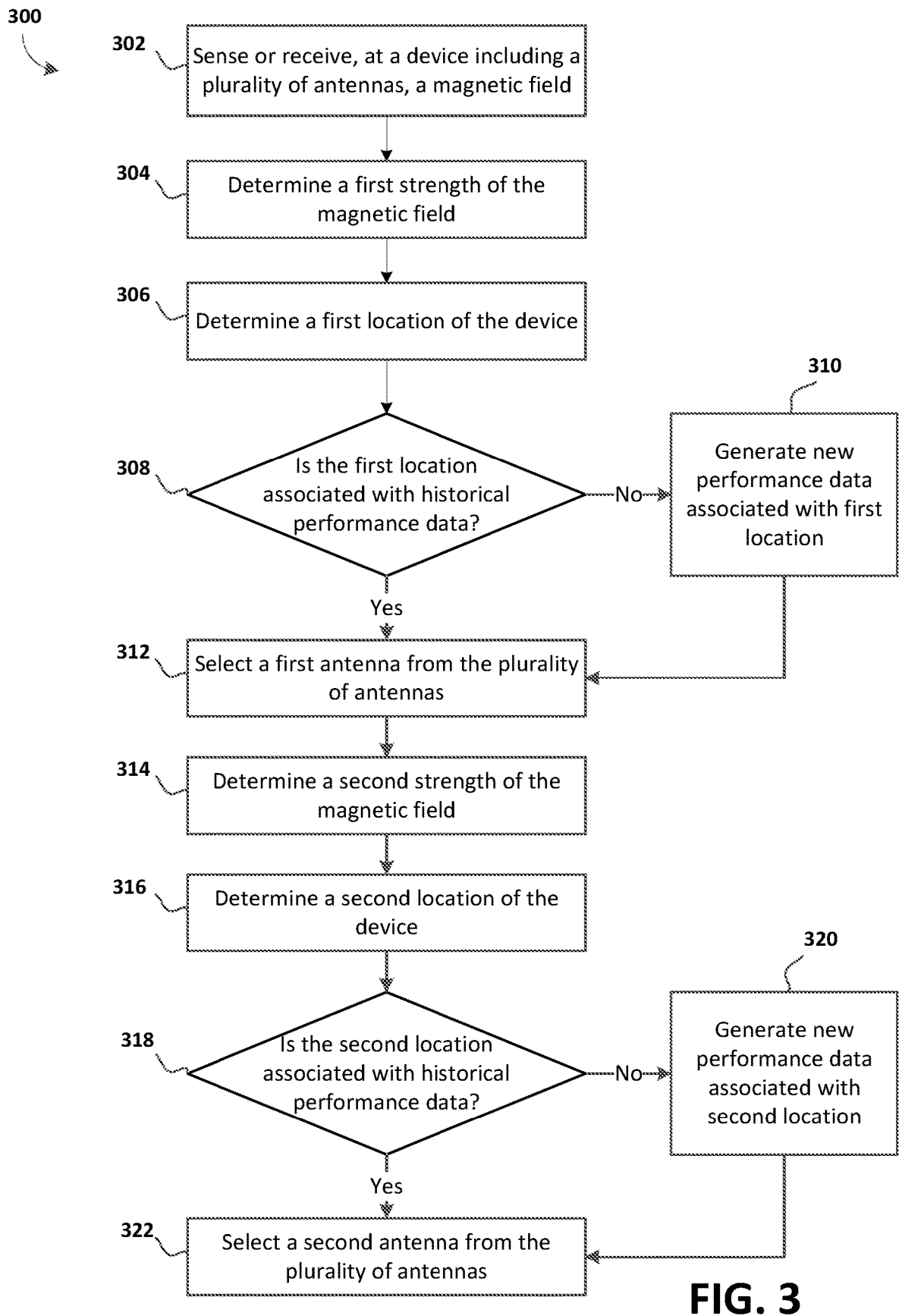
FIG. 3 shows an example method.
Figure 4:
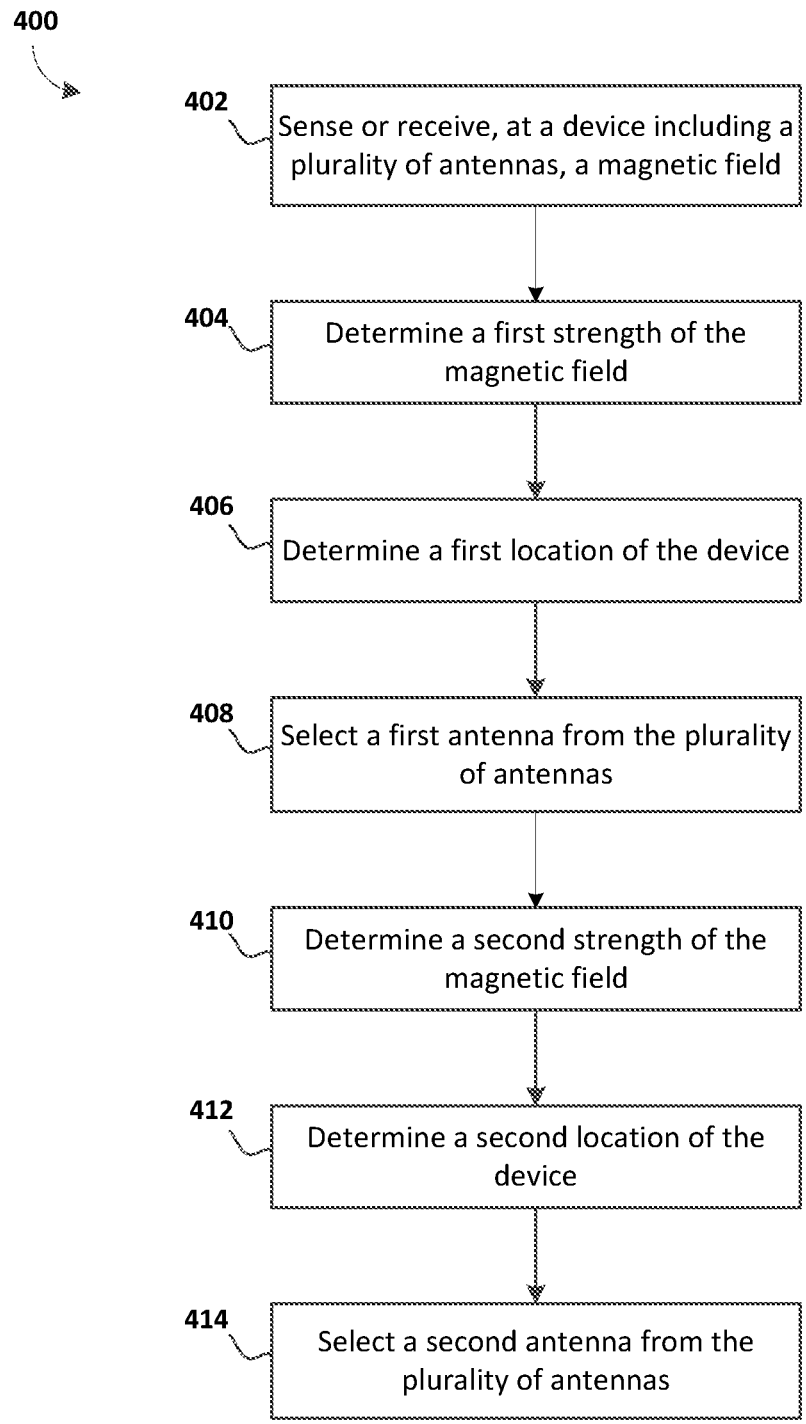
FIG. 4 shows an example method.

The memory device 206 may store instructions that, when executed by the processor 202, facilitate performance of the methods described in reference to FIGS. 3 and 4. The memory device 216 may store instructions that, when executed by the processor 214, facilitate performance of the methods described in reference to FIGS. 3 and 4.

The processor 214 may receive information from the gateway device 200, wherein the received information may indicate that the sensor device 210 is configured as a door/window sensor. When the magnetometer/contact sensor 222 detects a state change from a closed to open position, the magnetometer/contact sensor 222 may notify the processor 214. Upon notification from the magnetometer/contact sensor 222 that there is a state change, the processor 214 may execute one of the methods described in FIG. 3, 4, or 5 to select an antenna. The processor 214 may receive accelerometer information from the multi-axis sensor 220. When the sensor device 210 is configured as a door/window sensor, an accelerometer 217 of the multi-axis sensor 220 may detect movement of the sensor device 210 in an X, Y and/or Z plane.

FIG. 3 shows an example method 300 for selecting an antenna. A device may include a plurality of antennas. The performance of each antenna from the plurality of antennas may vary depending on the location of the device. For example, one antenna may operate best when the device is in a first location or first orientation, and a different antenna may operate best when the device is in a second location or second orientation. Therefore, each time the device moves, is moved, or changes locations, it may be desirable to automatically select the antenna that performs best in that particular location or position.

If the device has been in a location before, historical performance data associated with the location may already exist in a database. The historical performance data associated with the location may indicate which antenna is known to operate best at the location. The antenna that operates best at the location may be the antenna that transmits a signal with the best signal quality, the greatest signal strength, or the fewest number of retransmissions at the location. Because the antenna operates best at the location, using that antenna at that location may optimize the battery-life of the device. The antenna that operates best at the location, as indicated by the historical performance data, may automatically be selected from the plurality of antennas. By using the historical performance data to automatically select an antenna, the device does not need to determine an optimal antenna each time the device changes locations. If the device is battery-powered, eliminating the need to determine an optimal antenna each time the device changes locations may reduce the draw on the battery. As a result, the battery life of the device may be improved.

If the device has not been in a location or position before, historical performance data associated with the location may not exist. If historical performance data associated with the location does not exist, new performance data associated with the location may be generated and added to the database. The new performance data may indicate which antenna operates best at the location. The antenna that operates best at the location may be the antenna that transmits a signal with the best signal quality, the greatest signal strength, or the fewest number of retransmissions at the location. Once this new performance data is added to the database, it may become historical performance data. When the device is in this location in the future, such historical performance data may be used to automatically select the antenna that operates best at the location.

To determine which antenna to select, the location and/or orientation of the device may need to be determined. The location of the device may be determined using a magnetic field. At step 302, a magnetic field parameter may be sensed or received at the device. The magnetic field may be sensed or received at a device including a plurality of antennas. The device may be a sensor device, such as the sensor device 210 of FIG. 2 or the sensor device 130 of FIG. 1. The plurality of antennas of the device may be configured to receive or sense the magnetic field. Additionally, or alternatively, the device may include a magnetic field sensor (e.g., magnetometer/contact sensor 222) configured to sense or receive the magnetic field.

The magnetic field may be generated by a different device or device group, configured to generate a magnetic field, such as one or more magnetic devices. The device configured to generate the magnetic field may be installed at a location remote to the sensor device. For example, the sensor device may be installed on a window or on a door of a home, and the device configured to generate the magnetic field may be installed inside and/or outside of the home. The device configured to generate the magnetic field may be installed at a location remote to the gateway device. Additionally, or alternatively, the device configured to generate the magnetic field may be a component of the gateway device or installed within the gateway device.

The generated magnetic field may have different strengths when received by the sensor device, depending on the location of the device. The closer together the sensor device and the device configured to generate the magnetic field, the stronger the magnetic field sensed may be. As a result, the location or orientation of the sensor device may be determined using, at least in part, the strength of the received magnetic field. At step 304, at a first time, a first strength of the magnetic field may be determined. The first time may occur when the device begins transmitting packets to a receiver. As transmissions are made by the device, the first strength of the magnetic field may be measured. The first strength of the magnetic field may be determined at the device and may be determined using a device configured to measure magnetic field strength, such as a magnetometer. The device configured to measure magnetic field strength may be located external to the device or may be located within the device. The device may include a digital interface that provides a magnetic field reading indicating the first strength of the magnetic field.

As mentioned above, the closer together the device and the device configured to generate the magnetic field, the stronger the magnetic field may be. Accordingly, the first strength of the magnetic field may indicate a distance between the device and the device configured to generate the magnetic field. The strength of the magnetic field is inversely proportional to the distance between the device and the device configured to generate the magnetic field, squared. As a result, the greater the distance between the device and the device configured to generate the magnetic field, the weaker the magnetic field may be. For example, if the distance between the sensor device and the device configured to generate the magnetic field is doubled, the strength of the magnetic field may fall to a quarter of the initial value.

If the device is a window or door sensor, the first strength of the magnetic field may indicate a distance between the window or door sensor and the device configured to generate the magnetic field. The distance may vary depending on whether the window or door is opened or closed. If the window or door is open, the distance may vary depending on the degree of the opening. For example, if the window or door is completely open the distance may be greater than it would be if the window or door were only partially open.

At step 306, a first location of the device may be determined. The first location of the device may be determined, at least in part, based on the first strength of the magnetic field. The first strength of the magnetic field may indicate the distance between the device and the device configured to generate the magnetic field at the first time, and this distance may indicate the first location of the device. Determining the first location of the device may comprise determining a position of the device relative to the device configured to generate the magnetic field. For example, if the device is a window or door sensor, the device may be in the first location when the window or door is closed.

If the device has been in the first location before, historical performance data associated with the first location may exist. At step 308, it may be determined whether the first location of the device is associated with historical performance data. The first location may be associated with historical performance data if the device has been in the first location at a time prior to the first time. For example, if the device is a window or door sensor and the device is in the first location when the window or door is closed, the first location may be associated with historical performance data if the window or door has been closed before. If the device has never been in the first location before, the first location may not be associated with historical performance data.

Determining whether the first location of the device is associated with historical performance data may comprise comparing the first location to a database including historical performance data and determining that data associated with the first location is in the database. The database may include historical performance data associated with a variety of different locations. The historical performance data in the database may indicate which antenna operates best at the different locations. For example, historical performance data associated with the first location may include at least one of a signal quality, a signal strength, transmission quality and/or a number of retransmissions for each of the plurality of antennas when the device is in the first location.

If historical performance data associated with the first location exists, the historical performance data associated with the first location may indicate which antenna of the plurality of antennas operates best at the first location. For example, the historical performance data may indicate a particular antenna that has the highest signal quality, the best signal strength, or the fewest number of retransmissions at the first location. Because that antenna operates best at the first location, that antenna can automatically be selected again whenever the device is at the first location.

If the first location of the device is associated with historical performance data, the method 300 may proceed to step 312. Conversely, if the first location of the device is not associated with historical performance data, new performance data associated with the first location may need to be generated. For example, at step 310, new performance data associated with the first location may be generated. The new performance data may indicate which antenna operates best at the location. For example, the new performance data may indicate at least one of a signal quality, a signal strength, or a number of retransmissions for each of the plurality of antennas at the first location. Once the new performance data is added to the database, the device may not need to determine an optimal antenna next time the device is in the same location.

To generate the new performance data, a packet may be transmitted using a default antenna, such as the antenna that the device is already operating on at the first location. When the packet is transmitted, the quality and strength of the signal may be measured. It may be determined whether a retransmission of the packet occurs and how many retransmissions occur. If a retransmission does not occur, this may indicate that the default antenna is the antenna that operates best at the first location. In some aspects, performance data associated with the other antennas of the plurality may not need to be generated if no retransmissions are detected and the signal quality, signal strength, and number of retransmissions using the default antenna may be stored in the database. If the device is in the first location in the future, the device will use the new performance data stored in the database to automatically select the default antenna.

If a retransmission does occur while using the default antenna, the default antenna may not be the antenna that operates best at the first location. A number of retransmissions using the default antenna may be counted, and new performance data associated with a secondary antenna, such as an antenna other than the default antenna, may be generated. To generate the new performance data associated with the secondary antenna, a packet may be transmitted using the secondary antenna, and the quality and strength of the signal may be measured, as well any number of retransmissions. If a retransmission does not occur, this may indicate that the secondary antenna is the antenna that operates best at the first location and the signal quality, signal strength, and number of retransmissions using the secondary antenna may be stored in the database. If the device is in the first location in the future, the device will use the data stored in the database to automatically select the secondary antenna.

If a retransmission occurs both while using the default antenna and while using the secondary antenna, the new performance data for the default antenna may be compared to the new performance data for the secondary antenna. For example, the signal quality, signal strength, and number of retransmissions for the two antennas may be compared. Comparing the new performance data for the default antenna with the new performance data for the secondary antenna may comprise determining which of the two antennas causes the device to lose the least amount of battery life at the first location. For example, if fewer transmissions occur when the device operates using the default antenna, the default antenna may cause the device to lose the least amount of battery life at the first location. If fewer retransmissions occur when the device operates using the secondary antenna, the secondary antenna may cause the device to lose the least amount of battery at the first location. The antenna that causes the device to lose the least amount of battery at the location may be the antenna that operates best at the first location.

If the default antenna is the antenna that maximizes the battery life of the device at the location, the signal quality, signal strength, and number of retransmissions using the default antenna may be stored in the database. If the device is in the first location in the future, the device will use the data stored in the database to automatically select the default antenna. Conversely, if the secondary antenna is the antenna that maximizes the battery life of the device at the location, the signal quality, signal strength, and number of retransmissions using the secondary antenna may be stored in the database. If the device is in the first location in the future, the device will use the data stored in the database to automatically select the secondary antenna.

At step 312, the antenna that operates best at the first location or orientation may automatically be selected. If historical performance data associated with the first location existed, the antenna may be selected based on the historical performance data. If new performance data was generated for the first location, the antenna may be selected based on the new performance data. For example, a first antenna of the plurality of antennas may be selected. The first antenna may be selected if historical performance data or new performance data associated with the first location indicates that the first antenna operates best at the first location. The historical performance data or new performance data may indicate that the first antenna operates best at the first location if the first antenna has at least one of the highest signal quality, the best signal strength, or the fewest number of retransmissions at the first location. The device may use the first antenna to transmit and receive packets while the device remains in the first location. If the device changes locations, a different antenna may be selected.

For example, if and when the device changes orientation or location, a second strength of the magnetic field may be determined at step 314. The change may be determined by detecting a change in the first strength of the magnetic field. The second strength of the magnetic field may be used to determine the new location of the device. The second strength of the magnetic field may be determined at a second time that is after the first time when the first strength of the magnetic field is determined in step 304. The second time may occur when the device begins transmitting packets in a location that is different from the first location.

As transmissions are made by the device, the second strength of the magnetic field may be measured. The second strength of the magnetic field may be determined at the device and may be determined using a device configured to measure magnetic field strength, such as a magnetometer. The device configured to measure magnetic field strength may be located external to the device or may be located within the device. The device may also include a digital interface that provides a magnetic field reading indicating the second strength of the magnetic field. As discussed above with respect to the first strength of the magnetic field, the second strength of the magnetic field may indicate a distance between the device and the device configured to generate the magnetic field. The second strength of the magnetic field may indicate a distance between the device and the device configured to generate the magnetic field when the device is in a location different from the first location. For example, if the device is a window or door sensor and the device is in the first location when the window or door is closed, the second strength of the magnetic field may indicate a distance between the sensor and the device configured to generate the magnetic field when the window or door is opened. The distance may vary depending on the degree of the opening. For example, if the window or door is completely open the distance may be greater than it would be if the window or door were only partially open.

At step 316, a second location of the device may be determined. The second location of the device may be determined, at least in part, on the second strength of the magnetic field. The second strength of the magnetic field may indicate the distance between the device and the device configured to generate the magnetic field at the second time, and this distance may indicate the second location of the device. Determining the second location of the device may comprise determining a position of the device relative to the device configured to generate the magnetic field. For example, if the device is a window or door sensor, the device may be in the second location when the window or door is completely or partially opened.

If the device has been in the second location before, historical performance data associated with the second location may exist. At step 318, it may be determined whether the second location of the device is associated with historical performance data. The second location may be associated with historical performance data if the device has been in the second location at a time prior to the second time. For example, if the device is a window or door sensor and the device is in the second location when the window or door is completely closed, the second location may be associated with historical performance data if the window or door has been completely closed before. If the device has never been in the second location before, the second location may not be associated with historical performance data.

Determining whether the second location of the device is associated with historical performance data may comprise comparing the second location to the database including historical performance data and determining that data associated with the second location is in the database. If historical performance data associated with the second location exists, it may indicate which antenna of the plurality of antennas operates best at the second location. For example, the historical performance data may indicate which antenna has the highest signal quality, the best signal strength, or the fewest number of retransmissions at the second location. If the second antenna operates best at the second location, this may indicate that the device's battery life is maximized when the device operates using the second antenna at the second location.

If the second location of the device is associated with historical performance data, the method 300 may proceed to step 322. Conversely, if the second location of the device is not associated with historical performance data, new performance data associated with the second location may need to be generated. For example, at step 320, new performance data associated with the second location may be generated. The new performance data may indicate at least one of a signal quality, a signal strength, or a number of retransmissions for each of the plurality of antennas at the second location. Once generated, the new performance data may be added to the database for future use. If new performance data for the second location needs to be generated, it may be generated in a manner similar to how new performance data associated with the first location may be generated, described above.

At step 322, the antenna that operates best at the second location or orientation may automatically be selected. If historical performance data associated with the second location existed, the antenna may be selected base on the historical performance data. If new performance data was generated for the second location, the antenna may be selected based on the new performance data. For example, a second antenna of the plurality of antennas may be selected. The second antenna may be selected if the historical performance data or new performance data associated with the second location indicates that the second antenna operates best at the second location. The second antenna may be different from the first antenna. If the second antenna is different from the first antenna, selecting the second antenna may comprise switching use of the first antenna for the second antenna. The device may use the second antenna to transmit and receive packets while the device remains in the second location. If the device changes locations, a different antenna may again be selected.

FIG. 4 shows an example method 400 for automatically selecting an antenna based on the location of a device. The device may include a plurality of antennas. Each time the device changes locations, the device may automatically select an antenna that is associated with the new location. Different locations may be associated with different antennas. The antenna associated with a particular location may be the antenna that operates best at the location. If the antenna operates best at the location, it may be the antenna that maximizes the battery life of the device at the location. This automatic selection of an antenna eliminates the need to determine an optimal antenna each time the device changes locations. Eliminating the need to determine an optimal antenna each time the device changes locations may improve the battery life of the device.

At step 402, a magnetic field, such as the magnetic field of the method of FIG. 3, may be received at a first time. The magnetic field may be sensed or received at a device including a plurality of antennas. The plurality of antennas of the device may be configured to receive or sense the magnetic field. Additionally, or alternatively, the device may include a magnetic field sensor (e.g., magnetometer/contact sensor 222) configured to sense or receive the magnetic field. The device may be a sensor device, such as the sensor device 210 of FIG. 2 or the sensor device 130 of FIG. 1. At step 404, a strength of the magnetic field may be determined. The strength of the magnetic field may be determined in a manner similar to the manner described in FIG. 3. As discussed above, the strength of the magnetic field may indicate a distance between the device and the device configured to generate the magnetic field. For example, the greater the distance between the device configured to generate the magnetic field, the weaker the magnetic field may be. This distance may be used to determine a first location of the device.

At step 406, a first location of the device may be determined. Determining the first location of the device may comprise determining a position of the device relative to the device configured to generate the magnetic field. For example, if the device is a window or door sensor, the device may be in the first location when the window or door is closed. At step 408, a first antenna from the plurality of antennas may be selected. The first antenna may be the antenna from the plurality that is associated with the first location. For example, the first antenna may be associated with the first location if it causes the device to lose the least amount of battery life at the first location. The antenna may cause the device to lose the least amount of battery life at the first location if the first antenna has at least one of the highest signal quality, the best signal strength, or the fewest number of retransmissions at the location. The device may use the first antenna to transmit and receive packets while the device remains in the first location.

If the device changes locations, a different antenna associated with the new location may automatically be selected. For example, when the device changes locations, a second strength of the magnetic field may be determined at step 410. The strength of the magnetic field may be determined in a manner similar to the manner described in FIG. 3. The second strength of the magnetic field may indicate a distance between the device and the device configured to generate the magnetic field when the device is in a location different from the first location. This distance may be used to determine the new location of the device. At step 412, a second location of the device may be determined, the second location being different than the first location. Determining the second location of the device may comprise determining a position of the device relative to the device configured to generate the magnetic field. For example, if the device is a window or door sensor, the device may be in the second location when the window or door is open.

At step 414, a second antenna from the plurality of antennas may be selected. The second antenna may be the antenna from the plurality that is associated with the second location. For example, the second antenna may be associated with the second location if it causes the device to lose the least amount of battery life at the second location. The second antenna may cause the device to lose the least amount of battery life at the second location if the second antenna has at least one of the highest signal quality, the best signal strength, or the fewest number of retransmissions at the second location. The second antenna may be different from an antenna previously used by the device, such as the first antenna. If the second antenna is different from an antenna previously used by the device, selecting the second antenna may comprise switching use of a previously used antenna for the second antenna. The device may use the second antenna to transmit and receive packets while the device remains in the second location. If the device changes locations, a different antenna may again be selected.

Figure 5:
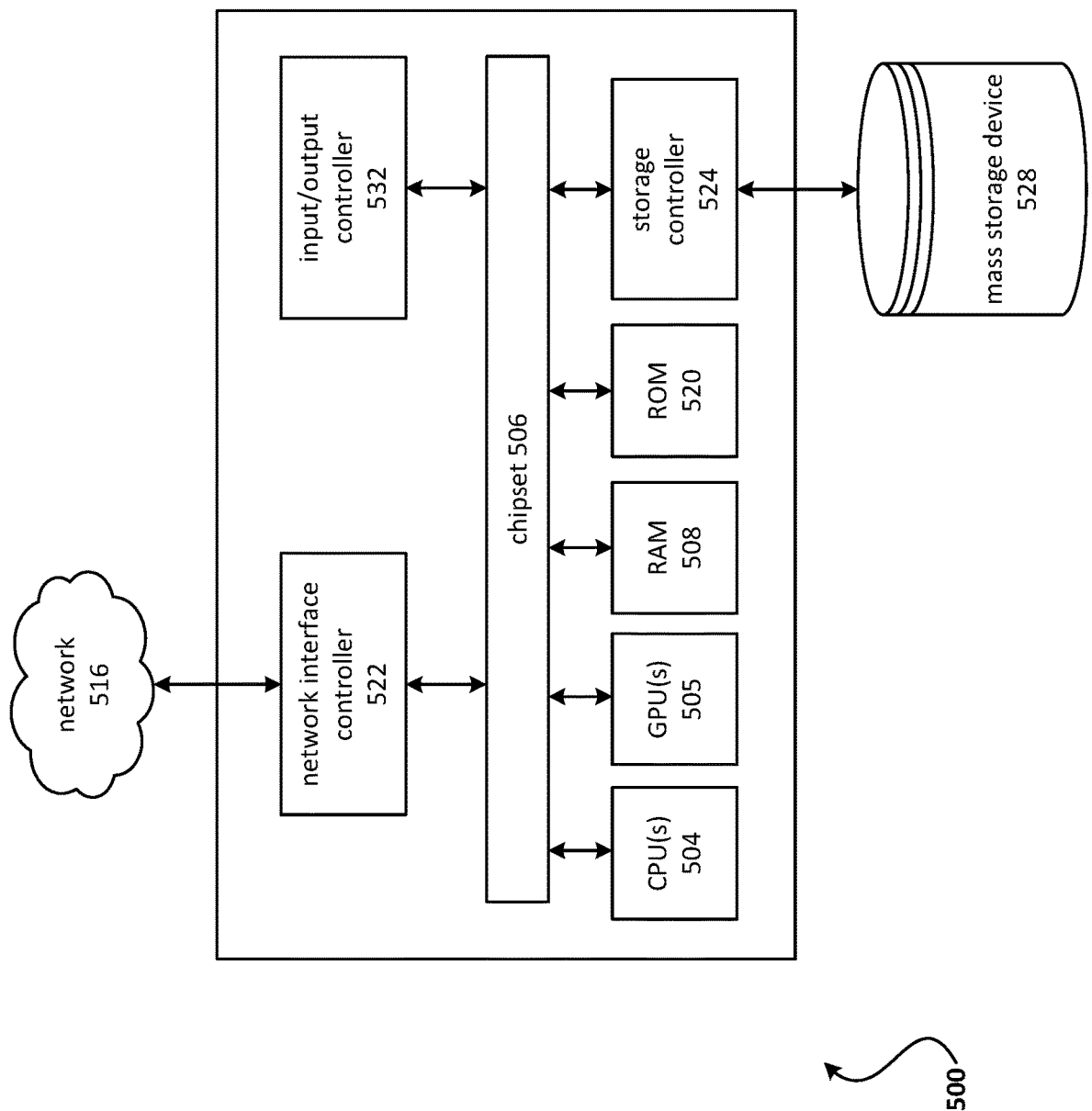
FIG. 5 shows an example computing device.

FIG. 5 depicts a computing device in which one or more of the apparatus described above may be embodied, such as the various apparatus illustrated in FIGS. 1 and 2. For example, with regard to the example systems of FIGS. 1 and 2, any of the user devices 190, the computing device 170, any of the modules 162, 166, 168 of the operator domain 160, the home computer 127, the gateway devices 120, sensor devices 130, and the sensor device 210 may each be implemented in an instance of a computing device 500 of FIG. 5. The computer architecture shown in FIG. 5 shows a conventional server computer, workstation, desktop computer, laptop, tablet, network appliance, PDA, e-reader, digital cellular phone, or other computing device or apparatus, and may be utilized to execute any aspects of the methods described herein, such as to implement the methods described in relation to FIGS. 3 and 4.

The computing device 500 may include a baseboard, or "motherboard," which is a printed circuit board to which a multitude of components or devices may be connected by way of a system bus or other electrical communication paths. One or more processors, such as central processing units (CPUs) 504, may operate in conjunction with a chipset 506. The CPU(s) 504 may be standard programmable processors that perform arithmetic and logical operations necessary for the operation of the computing device 500.

The CPU(s) 504 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to generate more complex logic circuits including registers, adders-subtractors, arithmetic logic units, floating-point units, and the like.

The CPU(s) 504 may be augmented with or replaced by other processing units, such as GPU(s) 505. The GPU(s) 505 may comprise processing units specialized for but not necessarily limited to highly parallel computations, such as graphics and other visualization-related processing.

A chipset 506 may provide an interface between the CPU(s) 504 and the remainder of the components and devices on the baseboard. The chipset 506 may provide an interface to memory, such as a random access memory (RAM) 508 used as the main memory in the computing device 500. The chipset 506 may provide an interface to a computer-readable storage medium, such as a read-only memory (ROM) 520 or non-volatile RAM (NVRAM) (not shown), for storing computer-executable instructions that when executed perform basic routines that may help to start up the computing device 500 and to transfer information between the various components and devices. ROM 520 or NVRAM may also store other software components necessary for the operation of the computing device 500 in accordance with the aspects described herein.

The computing device 500 may operate in a networked environment using logical connections to remote computing devices, servers, nodes, sensors, apparatus, and systems through local area network (LAN) 516. The chipset 506 may include functionality for providing network connectivity through a network interface controller (NIC) 522, such as a gigabit Ethernet adapter. A NIC 522 may be capable of connecting the computing device 500 to other computing devices over the network 516. It should be appreciated that multiple NICs 522 may be present in the computing device 500, connecting the computing device to other types of networks and remote computing devices or systems.

The computing device 500 may be connected to a mass storage device 528 that provides non-volatile storage for the computer. The mass storage device 528 may store system programs, application programs, other program modules, and data, which have been described in greater detail herein. The mass storage device 528 may be connected to the computing device 500 through a storage controller 524 connected to the chipset 506. The mass storage device 528 may consist of one or more physical storage units. A storage controller 524 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 500 may store data on the mass storage device 528 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 528 is characterized as primary or secondary storage and the like.

For example, the computing device 500 may store information to the mass storage device 528 by issuing instructions through a storage controller 524 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 500 may read information from the mass storage device 528 by detecting the physical states or characteristics of one or more particular locations within the physical storage units.

In addition to the mass storage device 528 described herein, the computing device 500 may have access to other computer-readable storage media to store and retrieve information, such as computer-executable instructions, program modules, data structures, or other data. It should be appreciated by those skilled in the art that computer-readable storage media may be any available media that provides for the storage of non-transitory data and that may be accessed by the computing device 500.

By way of example and not limitation, computer-readable storage media may include volatile and non-volatile, non-transitory computer-readable storage media, and removable and non-removable media implemented in any method or technology. As used herein, computer-readable storage media does not include transitory media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 528 depicted in FIG. 5, may store an operating system utilized to control the operation of the computing device 500. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 528 may store other system or application programs and data utilized by the computing device 500.

The mass storage device 528 or other computer-readable storage media may also be encoded with computer-executable instructions, which, when loaded into the computing device 500, transforms the computing device from a general-purpose computing system into a special-purpose computer capable of implementing the aspects described herein. These computer-executable instructions transform the computing device 500 by indicating how the CPU(s) 504 transition between states, as described herein. The computing device 500 may have access to computer-readable storage media storing computer-executable instructions, which, when executed by the computing device 500, cause performance of the methods described in relation to FIGS. 3 and 4.

A computing device, such as the computing device 500 depicted in FIG. 5, may also include an input/output controller 532 for receiving and processing input from a number of input devices, such as a keyboard, a mouse, a touchpad, a touch screen, an electronic stylus, or other type of input device. Similarly, an input/output controller 532 may provide output to a display, such as a computer monitor, a flat-panel display, a digital projector, a printer, a plotter, or other type of output device. It will be appreciated that the computing device 500 may not include all of the components shown in FIG. 5, may include other components that are not explicitly shown in FIG. 5, or may utilize an architecture completely different than that shown in FIG. 5.

As described herein, a computing device may be a physical computing device, such as the computing device 500 of FIG. 5. A computing device may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and apparatus described herein are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Example" means "an example of" and is not intended to convey an indication of a preferred or ideal embodiment. "Such as" is not used in a restrictive sense, but for explanatory purposes.

Components are described that may be used to perform the described methods and apparatus. When combinations, subsets, interactions, groups, etc., of these components are described, it is understood that while specific references to each of the various individual and collective combinations and permutations of these may not be explicitly described, each is specifically contemplated and described herein, for all methods and apparatus. This applies to all aspects of this application including, but not limited to, operations in described methods. Thus, if there are a variety of additional operations that may be performed it is understood that each of these additional operations may be performed with any specific embodiment or combination of embodiments of the described methods.

The methods and apparatus may take the form of an entirely hardware embodiment, an entirely software embodiment, or an embodiment combining software and hardware aspects. Furthermore, the methods and apparatus may take the form of a computer program product on a computer-readable storage medium having computer-readable program instructions (e.g., computer software) embodied in the storage medium. More particularly, the present methods and apparatus may take the form of web-implemented computer software. Any suitable computer-readable storage medium may be utilized including hard disks, CD-ROMs, optical storage devices, or magnetic storage devices.

Embodiments of the methods and apparatus are described above with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer-executable instructions. These computer-executable instructions may be loaded on a general-purpose computer, special-purpose computer, or other programmable data processing apparatus to produce a machine, such that the instructions which execute on the computer or other programmable data processing apparatus generate a means for implementing the functions specified in the flowchart block or blocks.

These computer-executable instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer-executable instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as example only, with a true scope and spirit being indicated by the following claims.

What is claimed is:

1. A method comprising:
sensing, at a device comprising a plurality of antennas, a magnetic field;
determining a first strength of the magnetic field;
determining, based on the first strength, a first location of the device; and
selecting, based on historical performance data associated with the first location, a first antenna from the plurality of antennas for transmitting data from the device.

2. The method of claim 1, further comprising:
comparing the first location to a database including the historical performance data; and
determining that the database includes historical performance data for the first location.

3. The method of claim 1, further comprising:
determining a second strength of the magnetic field;
determining, based on the second strength, a second location of the device;
generating, based on determining that the second location is not associated with the historical performance data, new performance data associated with the second location; and selecting, based on the new performance data associated with the second location, a second antenna from the plurality of antennas, the second antenna being different from the first antenna.

4. The method of claim 3, further comprising:
comparing the second location to a database including the historical performance data; and
determining that the database does not include historical performance data for the second location.

5. The method of claim 4 further comprising:
adding, to the database, the new performance data associated with the second location.

6. The method of claim 3, wherein the new performance data associated with the second location comprises at least one of a signal quality, a signal strength, or a number of retransmissions for each of the plurality of antennas.

7. The method of claim 3, wherein selecting, based on the new performance data associated with the second location, the second antenna from the plurality of antennas comprises:
switching use of the first antenna for the second antenna.

8. The method of claim 3, wherein the second strength of the magnetic field is determined after determining the first strength of the magnetic field.

9. The method of claim 1, wherein the historical performance data associated with the first location comprises at least one of a signal quality, a signal strength, or a number of retransmissions for each of the plurality of antennas.

10. The method of claim 1, wherein determining the first location of the device comprises:
determining, based on the first strength, a position of the device relative to a device configured to generate the magnetic field.

11. The method of claim 1, further comprising:
determining a second strength of the magnetic field;
determining, based on the second strength, a second location of the device; and
selecting, based on historical performance data associated with the second location, a second antenna from the plurality of antennas, the second antenna being different from the first antenna.

12. The method of claim 11, wherein selecting, based on the historical performance data associated with the second location, the second antenna from the plurality of antennas comprises:
switching use of the first antenna for the second antenna.

13. A method comprising:
sensing, at a device comprising a plurality of antennas, a magnetic field;
determining a first strength of the magnetic field;
determining, based on the first strength, a first orientation of the device; and
selecting, based on the first orientation, a first antenna from the plurality of antennas for transmitting data from the device.

14. The method of claim 13, further comprising:
determining a second strength of the magnetic field;
determining, based on the second strength, a second location of the device; and
selecting, based on the second location, a second antenna from the plurality of antennas, the second antenna being different from the first antenna.

15. The method of claim 14, wherein selecting the second antenna from the plurality of antennas comprises:
comparing a battery loss associated with the first antenna to a battery loss associated with the second antenna when the device is at the second location to determine that the battery loss associated with the first antenna is greater than the battery loss associated with the second antenna.

16. The method of claim 14, wherein selecting the second antenna from the plurality of antennas comprises:
switching use of the first antenna for the second antenna.

17. The method of claim 14, wherein determining, based on the first strength, the first location of the device comprises:
determining a position of the device relative to a device configured to generate the magnetic field.

18. A device comprising:
a plurality of antennas;
one or more processors; and
memory storing instructions that, when executed by the one or more processors, cause the device to:
sense a magnetic field;
determine a first strength of the magnetic field;
determine, based on the first strength, a first location of the device; and
select, based on the first location, a first antenna from the plurality of antennas for transmitting data from the device.

19. The device of claim 18, wherein the instructions that, when executed by the one or more processors, further cause the device to:
determine a second strength of the magnetic field;
determine, based on the second strength, a second location of the device; and
select, based on the second location, a second antenna from the plurality of antennas, the second antenna being different from the first antenna.

20. The device of claim 18, wherein the first location of the device is a position of the device relative to a device configured to generate the magnetic field.

* * * * *